US008800467B2

(12) United States Patent
Temple

(10) Patent No.: US 8,800,467 B2
(45) Date of Patent: Aug. 12, 2014

(54) FLOAT STRUCTURE MAINFRAME

(76) Inventor: James E. Temple, Arvada, CO (US)

( * ) Notice: Subject to any disclaimer, the term of this patent is extended or adjusted under 35 U.S.C. 154(b) by 288 days.

(21) Appl. No.: 13/200,577

(22) Filed: Sep. 26, 2011

(65) Prior Publication Data

US 2012/0073488 A1 Mar. 29, 2012

Related U.S. Application Data

(60) Provisional application No. 61/403,984, filed on Sep. 24, 2010.

(51) Int. Cl.
*B63B 7/00* (2006.01)

(52) U.S. Cl.
USPC .......................................... 114/345

(58) Field of Classification Search
CPC ............................ B63C 9/04; B63C 2009/042
USPC ............. 114/343, 345, 362, 61.1, 61.25, 352, 114/354, 266, 267; 441/35, 40, 42, 44, 46, 441/47, 49, 50, 52, 53, 54; 403/187, 188, 403/189, 190, 191, 192, 338, 373, 385, 386, 403/392, 393, 394, 395, 396, 398, 399, 403/400; 256/65.01, 68, 65.07; 285/120.1, 285/121.7, 154, 238
See application file for complete search history.

(56) References Cited

U.S. PATENT DOCUMENTS

| | | | | |
|---|---|---|---|---|
| 2,399,681 | A * | 5/1946 | Kemner | 403/176 |
| 2,839,320 | A * | 6/1958 | Hill | 403/172 |
| 3,045,263 | A | 7/1962 | Blachly | |
| 3,758,897 | A * | 9/1973 | Shaw | 441/45 |
| 3,950,804 | A | 4/1976 | Brumfeld | |
| 4,698,034 | A * | 10/1987 | Anthonijsz | 440/27 |
| 4,807,555 | A * | 2/1989 | Hart | 114/345 |
| 4,829,926 | A | 5/1989 | Voelkel | |
| 5,013,270 | A | 5/1991 | Walls | |
| 5,056,448 | A | 10/1991 | Miller, Sr. | |
| 6,209,853 | B1 * | 4/2001 | Roy et al. | 256/10 |
| 6,343,560 | B1 | 2/2002 | Myers | |
| 6,508,194 | B2 | 1/2003 | Myers | |
| 6,615,762 | B1 | 9/2003 | Scott | |
| 6,640,741 | B1 | 11/2003 | Myers | |
| 6,691,633 | B1 | 2/2004 | Metzger et al. | |
| 7,004,092 | B2 | 2/2006 | Yetter et al. | |
| 7,240,634 | B1 | 7/2007 | Hoge, Jr. | |
| 7,263,940 | B2 | 9/2007 | Yetter et al. | |
| 7,832,348 | B2 * | 11/2010 | Newcomb | 114/248 |

* cited by examiner

*Primary Examiner* — Stephen Avila
*Assistant Examiner* — Anthony Wiest
(74) *Attorney, Agent, or Firm* — Julie L. Bernard, LLC

(57) ABSTRACT

A mainframe for a float structure is described. The mainframe is detachably connectable to the dorsal surface of the float structure inflatables and comprises: a plurality of segmented and connectable cross-structure support members transversely attached to a plurality of segmented and connected longitudinal connector members via a connector member. Each of the longitudinal members and crossmembers may be made up of a plurality of detachable sections.

13 Claims, 7 Drawing Sheets

FLOAT STRUCTURE MAINFRAME

RELATED APPLICATIONS

This application is related to and claims the priority benefit of U.S. provisional application No. 61/403,984 filed on 24 Sep. 2010, the teachings and content of which are hereby incorporated by reference in their entirety.

FIELD OF INVENTION

The present invention relates to float structure frames. More particularly, the present invention relates to watercraft, e.g., catamarans and river rafts, and more specifically, those having pontoon configurations and a frame.

BACKGROUND OF THE INVENTION

White water rafting emerged as a recreational activity in the 1970's, growing into the present day commercial industry. Today's industry traces its roots back to a few adventurers using military surplus bridge pontoons and rafts to access and run rivers not previously accessible to the average rafter. These military-type early rafts were equipped with frames made of two-by-six lumber, held together with carriage bolts with an attached rowing platform made of cast iron. The resultant frames were heavy and cumbersome to transport and store.

Refinements in river rafts continued, as well as design improvements. The bow and stern lift became more pronounced, and chafing strips were added to protect against frame rubbing and abrasions from the river. Further developments have included fabrics such as polyester and Kevlar™, coatings such as polyvinyl chloride (PVC) and polyurethane, leading to improved boat designs. The most common currently used white water raft design is patterned after military bridge pontoons and life rafts and adapted to river running. Said raft design consists of inflatable outer tubes with an open center.

Those early frames were later replaced with welded aluminum frames, which were a significant improvement, but still were difficult to transport and store, and expensive to build. Later, the welded frames were replaced with plumbing fittings and pipe connections adapted from railing technologies, but this still resulted in a frame that had limited strength and structure and could not be disassembled easily.

In commercial river running operations, the access point to the river can often be in a remote location. If the raft and frame are bulky and cumbersome, a great deal of expense and labor are required to transport the raft to the river. As such, it is desirable to have mainframe that is able to be easily assembled and disassembled, strong enough to withstand rafting forces, and able to be contained within a small volume and of manageable weight. The instant mainframe, comprised of frame members and connector members, provides a light weight, easily transported and assembled mainframe that is able to attach to the dorsal surface of the inflatable of a float structure, provides rigid reinforcement to the top plane of the float structure, while providing both internal and external stability under pressure to the entirety of the float structure.

SUMMARY OF THE INVENTION

The present invention overcomes the shortcomings of the prior art by providing for a float structure mainframe that is made up of readily assembled and disassembled parts and is easily transported. The present invention includes a connector member that provides rigid mainframe assembly and reinforcement to the dorsal surface of the inflatable members of the float structure. When appropriately engaged with the float structure, the mainframe itself, thus, provides both internal and external support and reinforcement to the float structure. That is, the mainframe of the present invention provides a structure able to withstand the outside pressures from turbulent waters and waves, and provides the float structure stability to prevent bending of the float structure under pressure. The mainframe also provides support and strength from the open center wall of each inflatable to the opposite outer wall of the inflatable of the float structure via the connector member's form-fitting plate that rests on the curvature of the float structure inflatable. The connector member further allows for attachment or integration of various accessories to the mainframe.

The mainframe of the present invention comprises a first longitudinal member extending along the dorsal surface of a first inflatable, a second longitudinal member extending along the dorsal surface of a second inflatable. Additional longitudinal members, e.g., third and fourth, may be assembled as part of the mainframe. Each or all of the longitudinal frame members may be comprised of a single frame member or a plurality of sections assembled with the connector member. A plurality of crossmembers are detachably connected to the first and second longitudinal members via at least one connector member, said frame crossmembers defining a plurality of central areas within the longitudinal members. Once assembled, the longitudinal frame members and frame crossmembers are detachably connected, e.g., strapped or tied, to the inflatables so as to maintain the connector members' plates adjacent to and flush with the inflatables. As such, the mainframe is releasably fastened to the inflatables of the float structure.

The connector member is comprised of a plate, having a curve that is configured to sit flush with inflatables of a float device, a plurality of sleeves positioned perpendicular to the lengthwise axis of the plate for receiving the longitudinal members, and at least one sleeve positioned parallel to the lengthwise axis of the curved plate for receiving frame crossmembers. Each connector member sleeve and corresponding longitudinal frame member and frame crossmember have corresponding apertures capable of accommodating fastening members, e.g., spring clips, clavil pins, snap rings, bolts, dowels, or the like. A fastening member is inserted into said apertures and extends therethrough, thereby engaging and maintaining said frame member in position within the connector member.

More specifically, the connector member comprises a concave plate having an outer obverse surface and an inner converse surface, a central sleeve positioned lengthwise on the obverse surface of the plate, a distal sleeve and a proximal sleeve, said distal and proximal sleeves positioned perpendicular and planar to the central sleeve, and a flange rigidly connecting the obverse plate surface to the central sleeve and may have an aperture therethrough, and said central, distal and proximal sleeves having at least one clip aperture therethrough. The connector member provides for the convenient assembly, disassembly and transport of the mainframe.

The entire mainframe may be broken down and transported by aircraft, jet boat, vehicle or other forms of transportation to the float structure launch site. The mainframe is also easily stored in a space significantly smaller than that of an assembled mainframe, generally no larger than one-quarter to one-half of the area taken up by a fully assembled mainframe.

The mainframe may be assembled by a manufacturer or provided in a kit form to the float structure user.

Further included in the present invention is a j-knuckle connector member that facilitates the addition of frame crossmembers and auxiliary members to the mainframe. The j-knuckle is a connector member having a first male terminus extending from a crescent shaped second and opposite terminus creating a j-like shaped connector member. Via the j-knuckle connector member, said additional frame crossmembers or auxiliary members may be incorporated into the mainframe without necessarily being an integral section of the mainframe. The j-knuckle connector members may add accessories and auxiliary members to the mainframe, however, the use of frame crossmembers attached using a j-knuckle connector additionally provides lateral support for the float structure.

The presently described mainframe, comprising a plurality of frame members and a plurality of connector members in combination, is particularly useful with river rafts, but may be adapted for use with any float structure, such as rafts, pontoons, catarafts, catamarans, white water rafts, and the like.

It is an object of the present invention to provide a mainframe that is relatively inexpensive.

It is another object of the present invention to provide a mainframe that can be disassembled and stored in a small volume.

It is another object of the present invention to provide a means for assembling mainframes that are adaptable to a wide range of uses and varying float structures.

It is another object of the present invention to provide a mainframe that is adaptable to combining with auxiliary members. Auxiliary members, longitudinal frame members and frame crossmembers may be combined to provide a multitude of structural arrangements.

It is another object of the present invention to provide a mainframe that breaks down into common sized elements regardless of the float structure size or configuration.

It is another object of the present invention to provide a mainframe that is assembled with ease. A further object of the invention is to provide a mainframe that is formed entirely of prefabricated parts adapted to be assembled and disassembled without special tools.

It is another object of the present invention to provide a kit containing all of the parts for constructing a mainframe of the invention with relative ease and effort.

With minor adaptions and/or adjustments, the instant invention or components thereof may be alternatively employed in other industries for additional utilities, for example, scaffolding, pipeline assembly, tent and camper frames, and any other type of temporary framing.

These, and other objects and advantages of the present invention, will be apparent from the following detailed description. The above listing of objects of the invention should not be deemed as all-inclusive in any manner whatsoever.

DETAILED DESCRIPTION OF THE INVENTION

Figure 1:
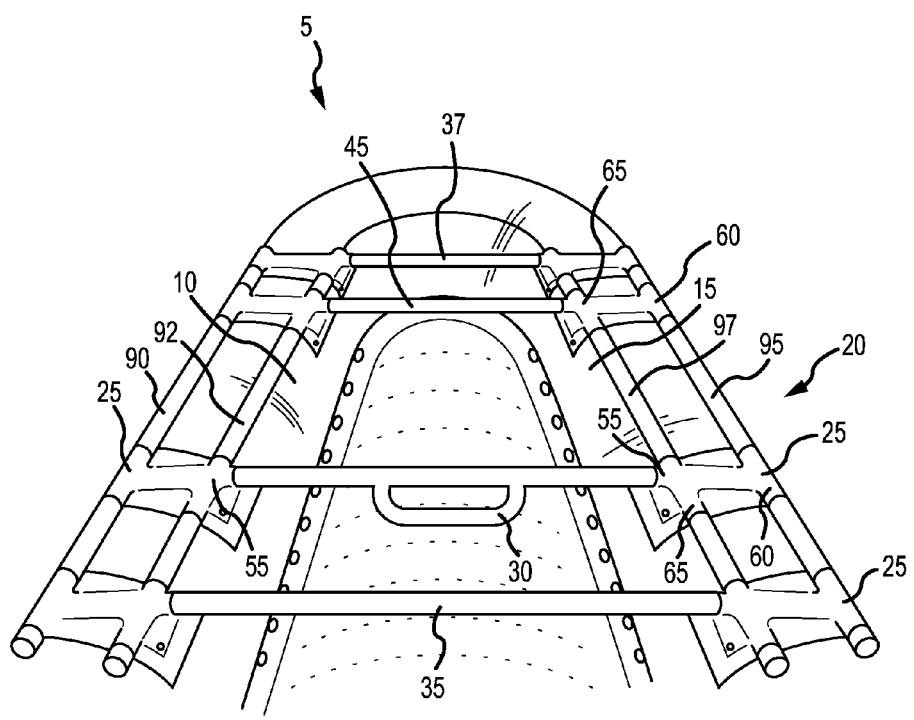
FIG. 1 is a perspective view showing a configuration and components of the mainframe, including longitudinal frame members, frame crossmembers, and auxiliary frame member, of the present invention.

The embodiments of the present invention described below are not intended to be exhaustive or to limit the invention to the precise forms disclosed in the following detailed description. Rather, the embodiments are chosen and described so that others skilled in the art can appreciate and understand the principles and practices of the present invention.

The general use of a mainframe for a float structure is known to those skilled in the art. The present invention adds to the mainframe concept connector members, tool free assembly and disassembly, frame members, auxiliary members, and more, that overcome the shortcomings of the prior art mainframes. One of the key aspects of the invention, the connector member, is comprised of a concave plate having an outer obverse surface with a central sleeve running lengthwise, inner converse surface that aligns with the dorsal curvature of the float structure inflatable, the central sleeve positioned lengthwise on the obverse plate surface for receiving and connecting frame crossmembers, a distal sleeve and a proximal sleeve for receiving and connecting longitudinal frame members and a flange rigidly connecting the obverse plate surface to the central sleeve providing stability, said flange optionally further having an aperture serving as a tie down position. Each of the sleeves having at least one aperture corresponding to frame member and frame crossmember apertures for the purpose of receiving a fastening member, e.g., a spring clip or clavil pin, utilized to secure the integral connections therebetween. The use of these fastening members allows for simple, efficient and complete assembly and disassembly without the use of special tools.

The connector member may be manufactured by any number of processes, e.g., injection molding, dye casting, welding, preferably, dye casting thus fulfilling objects of the invention. Some of the advantages of dye casting the connector members of the mainframe include, for example, reduced cost and the ability to easily replace components. The connector members, longitudinal frame members, and frame crossmembers, and segments thereof, may be manufactured from any number of materials. Further, the manufacture of these members can utilize different materials based upon desired weight, strength, flexibility, intended use, or other desirable attributes. The use of the connector member in combination with frame members enables a user to adapt the mainframe to various sized rafts, pontoons and catarafts. For example, with the present invention, a change to a longer or wider float structure allows for use of the same connector members and requires only the substitution of alternative longitudinal frame members or frame crossmembers.

Further included in the present invention is a j-knuckle connector member that facilitates the addition of frame crossmembers and auxiliary members to the mainframe. Said additional frame crossmembers or auxiliary members may be incorporated into the mainframe without necessarily being an integral section of the mainframe. The j-knuckle connector members may add accessories and auxiliary members to the mainframe, however, the use of frame crossmembers attached using a j-knuckle connector additionally provides lateral support for the float structure.

A typical float structure, as illustrated herein, may utilize 4-8 connector members in combination with a plurality of longitudinal frame members and a plurality of frame crossmembers to assemble a working mainframe. Further, float structures may comprise 1, 2 or more inflatables. For purposes of illustration, the present float structure comprises two inflatables. The present invention will now be further described with reference to the following illustrative example and Figures.

Referring to FIG. 1, a float structure 5 in accordance with the preferred embodiment of the present invention is shown. The float structure 5 includes a first inflatable 10, a second inflatable 15, a mainframe 20 that is detachably connected to the first and second inflatables, 10, 15 wherein a plurality of connector members 25 receive and engage longitudinal frame members 90, 92, 95, 97 and frame crossmembers 35, 37, 45. The configuration of the float structure 5 and mainframe 20 facilitate easy maneuverability at variable speeds relative to the movement of the water, and further allows an oarsman of the float structure to guide the float structure through the water with relative ease.

Although inflatables 10, 15 are described in conjunction with the preferred embodiment, it should be noted that solid or rigid pontoons may be utilized with the present invention. Hence, the inflatability of the inflatables 10, 15 should not be construed as a limitation on the mainframe 20 of the present invention. The present connector member 25 is intended to accommodate inflatable, rigid or solid pontoons ranging from 10 inches to 48 inches in diameter. However, without undue experimentation, one skilled in the art could calculate all adjustments necessary to the manufacture of a member connector capable of accommodating any size pontoon may be accommodated, including a flat, curveless plate. Further, the inflatable or pontoon portion of a float structure may comprise a single member or multiple members in combination. For ease of understanding, the instant invention describes a float structure made up of two, equally sized inflatables that are functionally positioned longitudinally to construct the float structure. Further, in other configurations, single or multiple inflatables may be comprised of multiple chambers.

When fully assembled, the mainframe 20 is detachably connected to the inflatables 10, 15 of the float structure 5, as shown in FIG. 1, by a plurality of straps 40, e.g., cam straps, which are fastened in a generally accepted manner known in the art to the inflatables 10, 15 of the float structure 5. A multitude of textiles may be used for the straps and are commercially available; selection of straps is based upon the need for specific strength, flexibility and durability of the textile, both wet and dry.

Figure 2:
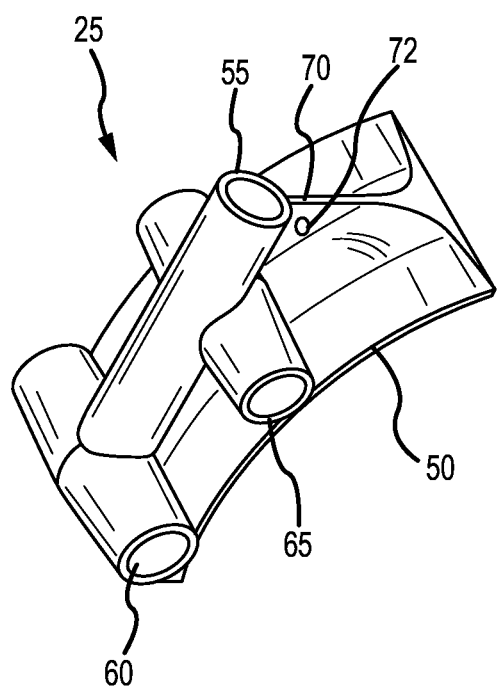
FIG. 2 is an isolated side view showing the configuration of the connector member.

FIG. 2 is an isolated perspective view of the connector member 25. The connector member 25 comprises a concave plate 50 having an outer obverse surface and an inner converse surface, a central sleeve 55 running lengthwise on the obverse surface of the plate 50, a distal sleeve 60 and a proximal sleeve 65, said distal and proximal sleeves 60, 65 being perpendicular and planar to the central sleeve 55, and a flange 70 rigidly connecting the obverse plate surface to the central sleeve 55 and optionally having an aperture 72 therethrough, said central, distal and proximal sleeves 55, 60, 65 having at least one clip aperture therethrough. The concave plate in the present illustration is rectangular in shape, but may be altered to any shape, e.g., parallelogram, triangle, oval, that does not alter its functionality.

The connector member 25 is utilized to receive and connect adjacent sections of the longitudinal frame members 90, 92, 95, 97, as well as receive and connect end frame crossmembers 35, 37 and medial frame crossmembers 45 of the mainframe 20, as shown in FIG. 1. Preferred construction materials of the connector member and frame members include, for example, are aluminum alloy (713.1 Alloy, tensile strength 36000 lbs/in$^2$, yield strength of 25000 lbs/in$^2$, mt 1100-1185 F.°) or polyurethane (TDI material, 75 SHORE D). However, the connector member may be constructed from plastics, composites (including graphite), alloys, titanium, stainless steel, bamboo, or other like materials. Additional materials may include combinations, such as, urethane with fiberglass filaments, Kevlar or other strengthening fibers, e.g., carbon fibers, dispersed therein. The considerations in choosing construction materials include strength, weight, cost, rigidity and availability of materials. The chosen material preferably carries a strength rating ranging from 30-90 dorometers, and more preferably, 75 dorometers.

Figure 3:
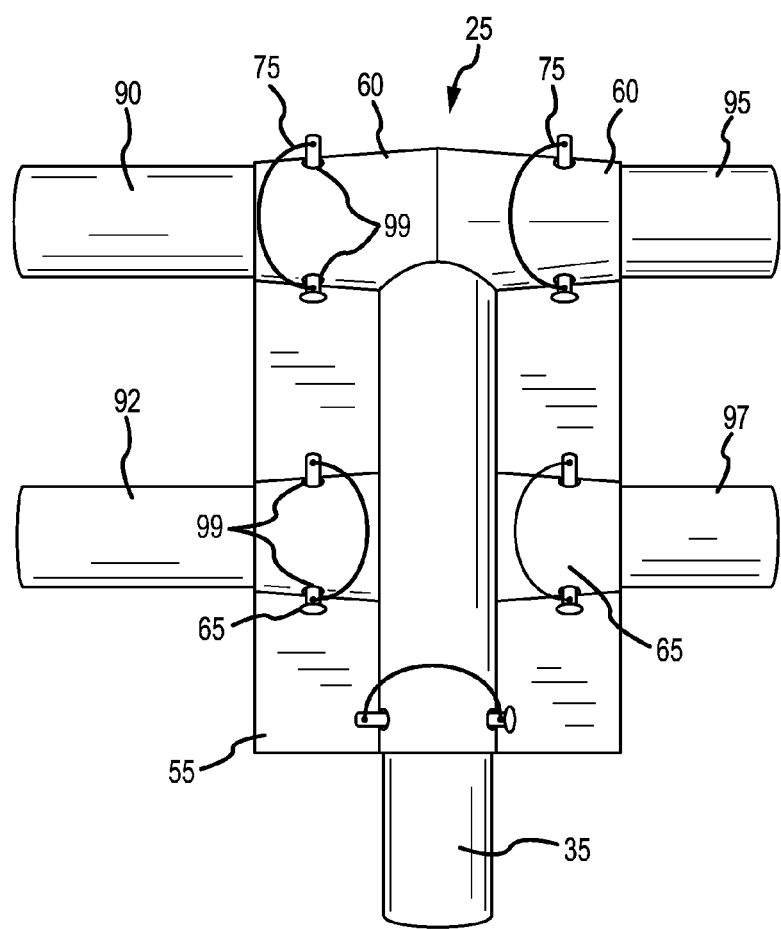
FIG. 3 is an isolated top view showing the configuration and engagement of the connector member.
Figure 7:
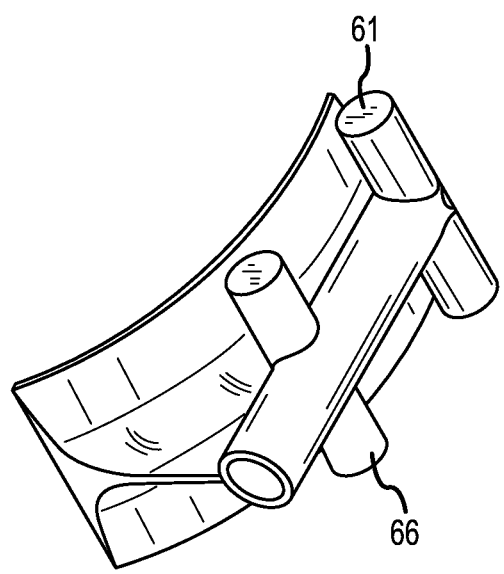
FIG. 7 is an isolated side view showing the male configuration of the connector member.

FIG. 3 shows a top perspective view of the connector member 25 engaged with both longitudinal frame members 90, 92, 95, 97 and a frame crossmember 35. Further, longitudinal frame members 90, 92, 95, 97 and frame crossmembers 35, 37, 45 may be constructed from the same or different material as the connector member 25. Sizing for the longitudinal frame members ranges in diameter from approximately 1-3 inches, and more preferably about 1.25-2 inches. Preferred sizing for the longitudinal frame members components and frame crossmembers of the present invention is 1.5 inch diameter tubing providing the "male" members corresponding to the "female" sleeves of the connector member 25. As such, the connector member sleeves 55, 60, 65 will have an interior diameter generally larger and corresponding to the exterior diameter of the longitudinal frame members and frame crossmembers such that the frame members may be inserted integrally into the connector member sleeve. It is possible to reverse the mail:female member relationship, an example of a "male connector member" is shown in FIG. 7. Such a configuration, in which male termini 61, 66 are substituted for proximal and distal sleeves, respectively, may not be as efficient in use or accurate in its construction, and therefore, not as easily adapted to individual structures. Such a construction configuration may ultimately, then, be more costly than the construction configuration presently set forth. Both the connector member sleeves 55, 60, 65 and the frame members have corresponding apertures 99 through which a fastening members 75 may be inserted when correctly aligned. As such, the frame member sections are stabilized within the connector member sleeve and are retained in engagement. For disassembly, the fastening members 75 are removed from the apertures 99, and the frame members are easily slid from the connector member sleeves.

Referring back to FIG. 1, the mainframe 20 of the present invention has first longitudinal frame member 90 that extends along the dorsal surface of a first inflatable 10. A second longitudinal frame member 95 extends along the dorsal surface of a second inflatable 15. The first and second longitudinal frame members 90, 95 are comprised of a plurality of member segments connected end to end by engagement with the distal sleeve 60 of the connector member 25. A single longitudinal frame member may be utilized by sliding it through each connector members and appropriately spacing said connector members for engagement with frame crossmembers. A third longitudinal frame member 92 and fourth longitudinal frame member 97 may be extended along the dorsal surface of the first and second inflatables 10, 15, respectively, by engaging the proximal sleeves 65 of the connector member 25. Further shown is first frame crossmember 35 connected to one end of the first longitudinal frame member 90 and one end of the second longitudinal member 95 by inserting the respective ends into the central sleeve 55 of a connector member 25 and locking them into place with a fastening member 75. The frame crossmember 35 thereby extending between each of the first inflatable 10 and second inflatable 15. Similarly, a second frame crossmember 37 is connected to the other ends of the first and second longitudinal frame members 92, 95. The longitudinal frame members 90, 95 and end frame crossmembers 35, 37 define a rectangular configuration congruent with the dorsal surface of the float structure. The mainframe 20 further includes at least one medial frame crossmember 45, which extends between the first and second longitudinal members 90, 95 by engagement with the connector member 25 as described herein and extends across the inflatables 10, 15. Any number of medial frame crossmembers may be inserted into the structure of the mainframe 20 and is dependent upon the number of connector members 25 or other members capable of engagement employed in the assembly of the first and second longitudinal members 90, 95.

The first and second longitudinal members 90, 95, may further comprise a plurality of auxiliary members, for example, oarlock assemblies or foothold 30. Oarlock assemblies may be removably and functionally attached to the first and second longitudinal members 90, 95, respectively, via a j-knuckle member 100 or, alternatively as part of the mainframe by sliding a "cross-T" (known in the art) fitting onto one of the longitudinal members of the mainframe during assembly; either configuration may be preferred based upon evaluation criteria, e.g., moveability, stability, strength, and the like. Oarlocks are available off-the-shelf and are manufactured by a number of different companies, and illustrate the ease with which the present mainframe may be re-configured.

A j-knuckle member 120 is a fixture for attaching frame crossmembers or other attachments to the mainframe without the necessity of incorporating said crossmembers or other attachments into the actual construction of the mainframe. That is to say, that the j-knuckle member may be employed for the detachable mounting of any number of auxiliary members to the mainframe 20; the configuration facilitates the easy addition or removal, as desired, of the auxiliary members. Examples of auxiliary members that may be adapted to and employed with the connector members and/or j-knuckles are: oar slot, fishing rod holder, fisherman support braces, chair bracket, motor mount, seat, storage receptacle, cooler receptacle, storage box, and foot hold.

Figure 4:
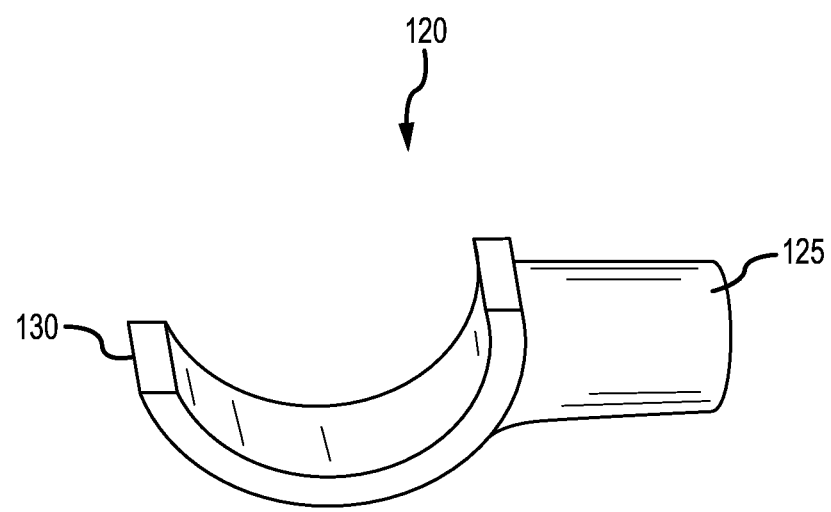
FIG. 4 is a side view of the j-knuckle connector member.
Figure 5:
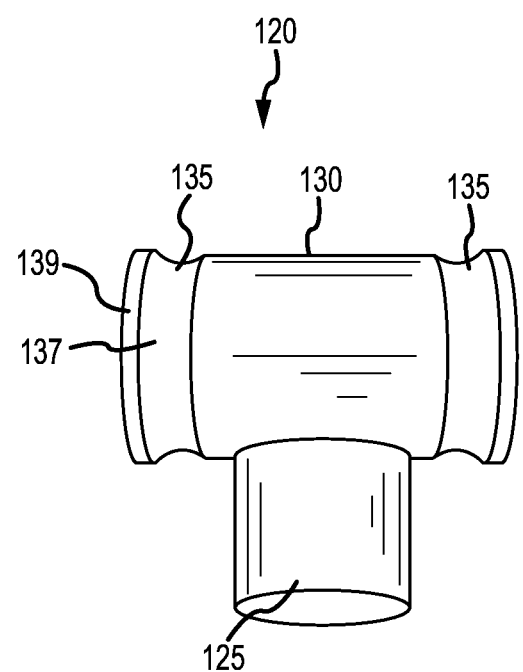
FIG. 5 is a top view of the j-knuckle connector member.
Figure 6:
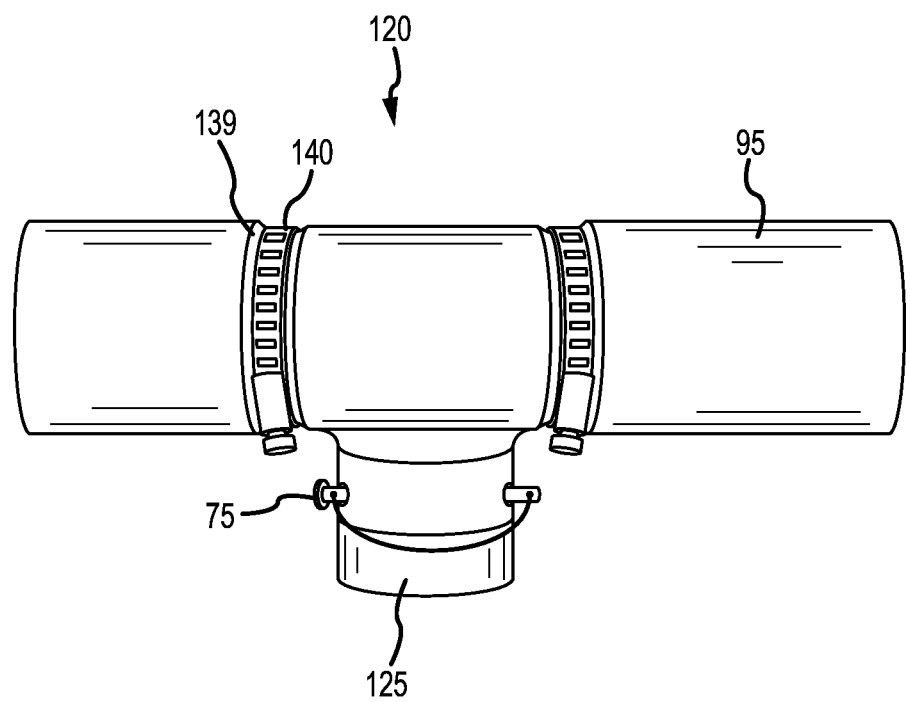
FIG. 6 is a detailed view of the j-knuckle configured into a mainframe of the present invention.

As shown in FIG. 4, the j-knuckle 120 is a connector member having first male terminus 125 extending from a crescent shaped second and opposite terminus 130 creating a j-like shaped connector member. Said crescent shaped terminus 130 has, as shown in FIG. 5, at least 1 engagement lip 135 extending laterally therefrom, and preferably 2 lips, one extending laterally from each side of the crescent shaped terminus 130. The engagement lip comprises a flat section 137 configured to receive a securing mechanism, e.g., hose clamp 140 or the like, extending into a retaining edge 139 to prevent securing mechanism slippage. Incorporation of the j-knuckle into a mainframe configuration wherein the j-knuckle is engaging a frame crossmember and longitudinal frame members is shown in FIG. 6. Additional stability of the knuckle can be accomplished by use of a set screw, or the like, through the knuckle and securing it to the frame crossmember or longitudinal frame member.

In combination, FIGS. 1 and 3 illustrate the manner in which the connector member 25 is utilized to engage the longitudinal frame members 90, 92, 95, 97 frame crossmembers 35, 37, 45 and other auxiliary members.

The mainframe of the present invention offers significant advantages over the prior art, including but not limited to: the plurality of sections used to assemble the mainframe allow for easy transportability and facilitates a plethora of configurations. Disassembly may be easily accomplished, and when broken down, the components occupy a significantly smaller volume than the assembled mainframe. Another advantage is that the connector member allows for myriad configurations of an easily assembled and disassembled mainframe that may be adapted to many different types and/or shapes of float structures, while providing float structure stability.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

Any patents, patent documents, or publications cited herein are hereby incorporated by reference as if individually incorporated.

I claim:

1. A unibody connector member comprising: a concave plate having an outer obverse surface and an inner converse surface, a central sleeve running lengthwise on the obverse surface of the plate, a distal sleeve and a proximal sleeve, said distal and proximal sleeves intersecting the central sleeve and being perpendicular and planar to the central sleeve, and a flange rigidly connecting the obverse plate surface to the central sleeve, said central, distal and proximal sleeves each having at least one clip aperture therethrough.

2. The connector member of claim 1, wherein the flange has a aperture therethrough.

3. A float structure mainframe comprising: a plurality of connector members of claim 1 and a plurality of separable members operatively configured into a mainframe.

4. The mainframe of claim 3, wherein said separable members comprise a plurality of longitudinal frame members and a plurality of frame crossmembers.

5. The mainframe of claim 3, said mainframe comprising:
   a. A first distal longitudinal frame member and a first inflatable of a float structure said first inflatable having a dorsal surface, said first distal longitudinal frame member extending along the dorsal surface of the first inflatable of the float structure;
   b. A second distal longitudinal frame member and a second inflatable of a float structure, said second inflatable having a dorsal surface, said second distal longitudinal frame member extending along the dorsal surface of a second inflatable of the float structure;
   c. A first frame crossmember connected to one end of said first and second distal longitudinal frame members; and,
   d. A second frame crossmember connected to the opposite end of said first and second distal longitudinal frame members,
   wherein, all frame members are operatively connected with said connector members.

6. The mainframe of claim 5, further comprising: at least one medial frame crossmember operatively connected to said first longitudinal frame member and to said second longitudinal frame member.

7. The mainframe of claim 3, said mainframe comprising:
   a. A first distal longitudinal frame member extending along the dorsal surface of a first inflatable of a float structure;
   b. A second distal longitudinal frame member extending along the dorsal surface of a second inflatable of the float structure;
   c. A first proximal longitudinal frame member parallel and adjacent to the first outer longitudinal member;

d. A second proximal longitudinal frame member parallel and adjacent to the second outer longitudinal member; and, e. A first frame crossmember connected to one end of said first and second distal and proximal longitudinal frame members; and a second frame crossmember connected to the opposite end of said first and second longitudinal\frame members, wherein, all members are operatively connected with said connector members.

8. The mainframe of claim 7, further comprising: at least one medial frame crossmember operatively connected to said first distal or proximal longitudinal frame member and to said second distal or proximal longitudinal frame member.

9. The mainframe of claim 3, further comprising: a plurality of medial frame crossmembers operatively connected to said separable members.

10. The mainframe of claim 3, further comprising at least one auxiliary member.

11. The mainframe of claim 10, wherein said auxiliary member is chosen from the group consisting of an oarlock, oar slot, rod holder, support braces, chair bracket, motor mount, seat, storage receptacle, and foot hold.

12. The mainframe of claim 3, further comprising a plurality of auxiliary members.

13. The mainframe of claim 12, wherein the plurality of auxiliary members is chosen from the group consisting of an oarlock, oar slot, rod holder, support braces, chair bracket, motor mount, seat, storage receptacle, and foot hold.

* * * * *